(12) United States Patent
Resh et al.

(10) Patent No.: US 12,553,500 B2
(45) Date of Patent: Feb. 17, 2026

(54) LINEAR ACTUATOR

(71) Applicant: Apptronik Inc., Austin, TX (US)

(72) Inventors: Bradley Resh, Austin, TX (US); Paul Gloninger Fleury, Austin, TX (US); Nicholas Arden Paine, Austin, TX (US); Jonas Alexan Fox, Austin, TX (US); Daniel Stephen Mitchell, Dripping Springs, TX (US); James Cornelius Cobau, Austin, TX (US)

(73) Assignee: Apptronik, Inc., Austin, TX (US)

( * ) Notice: Subject to any disclaimer, the term of this patent is extended or adjusted under 35 U.S.C. 154(b) by 57 days.

(21) Appl. No.: 18/724,750

(22) PCT Filed: Mar. 8, 2024

(86) PCT No.: PCT/US2024/019194
§ 371 (c)(1),
(2) Date: Jun. 27, 2024

(87) PCT Pub. No.: WO2024/191850
PCT Pub. Date: Sep. 19, 2024

(65) Prior Publication Data
US 2025/0283528 A1    Sep. 11, 2025

Related U.S. Application Data

(60) Provisional application No. 63/489,610, filed on Mar. 10, 2023.

(51) Int. Cl.
*F16H 25/22* (2006.01)
*B25J 9/12* (2006.01)
(Continued)

(52) U.S. Cl.
CPC .......... *F16H 25/2204* (2013.01); *B25J 9/123* (2013.01); *B62D 57/032* (2013.01); *F16H 2025/204* (2013.01); *F16H 2025/2075* (2013.01)

(58) Field of Classification Search
CPC ............. F16H 25/2204; F16H 25/2418; F16H 25/204; F16H 25/2075; B62D 57/032;
(Continued)

(56) References Cited

U.S. PATENT DOCUMENTS 6,067,868 A     5/2000  Nakamura et al.
8,495,924 B2 *  7/2013  Fukano ............... F16H 25/2454
                                                        74/89.44
(Continued)

FOREIGN PATENT DOCUMENTS

DE           19519948       12/1996
WO     WO 2022174344 A1     8/2022
(Continued)

OTHER PUBLICATIONS

International Search Report and Written Opinion in International Appln. No. PCT/US2024/019194, mailed on Jun. 25, 2024, 17 pages.

*Primary Examiner* — Christopher B Wehrly
(74) *Attorney, Agent, or Firm* — Fish & Richardson P.C.

(57) ABSTRACT

A linear actuator includes a housing; a motor module that includes a motor; and a drivetrain module coupled to the motor module. The drivetrain module includes a ball screw coupled to the motor, a ball nut coupled to and configured to linearly ride on the ball screw during rotation of the ball screw, a rod coupled to the ball nut and configured to extend or retract from the housing based on the ball nut linearly riding on the ball screw during rotation of the ball screw, and an anti-rotation bushing coupled to the rod and including at least one slot configured to engage with and linearly ride on (Continued)

a key coupled to an inner surface of the housing based on the ball nut linearly riding on the ball screw during rotation of the ball screw. The anti-rotation bushing is further configured to restrain the rod against rotation during extension and retraction.

34 Claims, 5 Drawing Sheets

(51) Int. Cl.
*B62D 57/032* (2006.01)
*F16H 25/20* (2006.01)
(58) Field of Classification Search
CPC .......... B25J 9/123; B25J 9/102; B25J 9/0006; H02K 7/06
USPC ....................................................... 180/8.6
See application file for complete search history.

(56) References Cited

U.S. PATENT DOCUMENTS

| | | | |
|---|---|---|---|
| 8,754,347 B2* | 6/2014 | Murai | B23K 11/315 219/86.25 |
| 9,080,918 B2 | 7/2015 | Fishel et al. | |
| 10,253,855 B2* | 4/2019 | Potter | B25J 17/0241 |
| 11,312,012 B2 | 4/2022 | Kaehler | |
| 11,461,867 B2 | 10/2022 | Gildert et al. | |
| 11,478,927 B1 | 10/2022 | Kranski et al. | |
| 11,625,122 B2 | 4/2023 | Kranski et al. | |
| 11,636,398 B2 | 4/2023 | Kranski et al. | |
| 11,639,004 B2 | 5/2023 | Khadivinassab et al. | |
| 11,691,270 B2 | 7/2023 | Shannon | |
| 11,691,274 B2 | 7/2023 | Kaehler | |
| 11,691,278 B2 | 7/2023 | Kranski et al. | |
| 11,717,963 B2 | 8/2023 | Gildert et al. | |
| 11,717,974 B1 | 8/2023 | Gildert et al. | |
| 11,787,049 B2 | 10/2023 | Gildert et al. | |
| 11,787,050 B1 | 10/2023 | Kaehler et al. | |
| 11,812,126 B2 | 11/2023 | Hill et al. | |
| 11,848,014 B2 | 12/2023 | Peck | |
| 11,865,703 B2 | 1/2024 | Shannon et al. | |
| 11,867,574 B1 | 1/2024 | Fishel et al. | |
| 11,913,562 B2 | 2/2024 | Sterling et al. | |
| 11,931,894 B1 | 3/2024 | Rose et al. | |
| 11,938,634 B2 | 3/2024 | Gildert et al. | |
| 11,999,063 B1 | 6/2024 | Rose et al. | |
| 12,011,867 B2 | 6/2024 | Sterling et al. | |
| 12,030,196 B2 | 7/2024 | Gildert | |
| 12,066,347 B2 | 8/2024 | Wu et al. | |
| 12,099,343 B2 | 9/2024 | Kaehler | |
| 12,122,040 B2 | 10/2024 | Gildert et al. | |
| 12,124,651 B2 | 10/2024 | Kranski et al. | |
| 12,129,944 B2 | 10/2024 | Sterling et al. | |
| 12,138,809 B2 | 11/2024 | Rose | |
| 12,145,266 B2 | 11/2024 | Rose et al. | |
| 12,157,226 B2 | 12/2024 | Kranski et al. | |
| 12,162,138 B2 | 12/2024 | Shannon | |
| 12,162,153 B2 | 12/2024 | Rose et al. | |
| 12,172,297 B2 | 12/2024 | Khadivinassab et al. | |
| 12,172,307 B2 | 12/2024 | Shannon et al. | |
| 12,172,317 B2 | 12/2024 | Kaehler et al. | |
| 12,172,327 B2 | 12/2024 | Gildert | |
| 12,404,919 B2* | 9/2025 | Wegener | F16H 25/24 |
| 2018/0031091 A1* | 2/2018 | Wu | F16H 25/2015 |
| 2018/0172121 A1 | 6/2018 | Potter et al. | |
| 2020/0361101 A1* | 11/2020 | Zhang | B25J 19/0025 |
| 2021/0122035 A1 | 4/2021 | Furlan | |
| 2021/0307170 A1 | 9/2021 | Wu et al. | |
| 2022/0101477 A1 | 3/2022 | Gildert et al. | |
| 2022/0105643 A1 | 4/2022 | Shannon | |
| 2022/0105644 A1 | 4/2022 | Shannon | |
| 2022/0314435 A1 | 10/2022 | Wales et al. | |
| 2022/0314448 A1 | 10/2022 | Wales et al. | |
| 2022/0324113 A1 | 10/2022 | Rose | |
| 2022/0324114 A1 | 10/2022 | Rose | |
| 2022/0355485 A1 | 11/2022 | Rose | |
| 2022/0355486 A1 | 11/2022 | Rose | |
| 2022/0355487 A1 | 11/2022 | Rose | |
| 2022/0355853 A1* | 11/2022 | Seo | B62D 5/046 |
| 2022/0371183 A1 | 11/2022 | Shannon et al. | |
| 2022/0390045 A1 | 12/2022 | Sterling et al. | |
| 2022/0402126 A1 | 12/2022 | Gildert | |
| 2022/0404835 A1 | 12/2022 | Gildert | |
| 2023/0023985 A1 | 1/2023 | Shannon | |
| 2023/0053753 A1 | 2/2023 | Gildert et al. | |
| 2023/0054297 A1 | 2/2023 | Gildert et al. | |
| 2023/0056745 A1 | 2/2023 | Gildert et al. | |
| 2023/0078625 A1 | 3/2023 | Kaehler et al. | |
| 2023/0083349 A1 | 3/2023 | Kranski et al. | |
| 2023/0085731 A1 | 3/2023 | Shannon et al. | |
| 2023/0111067 A1 | 4/2023 | Gildert et al. | |
| 2023/0111284 A1 | 4/2023 | Gildert et al. | |
| 2023/0114376 A1 | 4/2023 | Gildert et al. | |
| 2023/0122611 A1 | 4/2023 | Rose | |
| 2023/0148120 A1 | 5/2023 | Kranski et al. | |
| 2023/0150135 A1 | 5/2023 | Shannon | |
| 2023/0202028 A1 | 6/2023 | Gildert et al. | |
| 2023/0202029 A1 | 6/2023 | Shannon | |
| 2023/0202038 A1 | 6/2023 | Gildert et al. | |
| 2023/0205291 A1 | 6/2023 | Shannon | |
| 2023/0205292 A1 | 6/2023 | Shannon | |
| 2023/0211507 A1 | 7/2023 | Shannon | |
| 2023/0237378 A1 | 7/2023 | Kranski et al. | |
| 2023/0278201 A1 | 9/2023 | Gildert | |
| 2023/0278202 A1 | 9/2023 | Gildert | |
| 2023/0278223 A1 | 9/2023 | Gildert | |
| 2023/0297186 A1 | 9/2023 | O'Rourke | |
| 2023/0302659 A1 | 9/2023 | Lee et al. | |
| 2023/0302660 A1 | 9/2023 | Lee et al. | |
| 2023/0302661 A1 | 9/2023 | Martin | |
| 2023/0311316 A1 | 10/2023 | Gildert et al. | |
| 2023/0333593 A1 | 10/2023 | Meier | |
| 2023/0339104 A1 | 10/2023 | Kaehler | |
| 2023/0364806 A1 | 11/2023 | Lee et al. | |
| 2023/0364807 A1 | 11/2023 | Lee et al. | |
| 2023/0364808 A1 | 11/2023 | Lee et al. | |
| 2023/0381957 A1 | 11/2023 | Gildert et al. | |
| 2023/0381958 A1 | 11/2023 | Gildert et al. | |
| 2024/0033921 A1 | 2/2024 | Moore et al. | |
| 2024/0033922 A1 | 2/2024 | Moore et al. | |
| 2024/0037848 A1 | 2/2024 | Moore et al. | |
| 2024/0046572 A1 | 2/2024 | Moore et al. | |
| 2024/0046573 A1 | 2/2024 | Moore et al. | |
| 2024/0096003 A1 | 3/2024 | Gildert et al. | |
| 2024/0096004 A1 | 3/2024 | Gildert et al. | |
| 2024/0096005 A1 | 3/2024 | Gildert et al. | |
| 2024/0109612 A1 | 4/2024 | Gildert | |
| 2024/0175516 A1 | 5/2024 | Foroughi et al. | |
| 2024/0181647 A1 | 6/2024 | Gildert et al. | |
| 2024/0208082 A1 | 6/2024 | Shannon et al. | |
| 2024/0217096 A1 | 7/2024 | Maleki et al. | |
| 2024/0246231 A1 | 7/2024 | Gildert et al. | |
| 2024/0253211 A1 | 8/2024 | Rose et al. | |
| 2024/0253212 A1 | 8/2024 | Rose et al. | |
| 2024/0253220 A1 | 8/2024 | Wells et al. | |
| 2024/0253221 A1 | 8/2024 | Gidert | |
| 2024/0253222 A1 | 8/2024 | Gidert | |
| 2024/0253239 A1 | 8/2024 | Gidert | |
| 2024/0253243 A1 | 8/2024 | Gidert | |
| 2024/0256794 A1 | 8/2024 | Gidert | |
| 2024/0278435 A1 | 8/2024 | Gildert | |
| 2024/0280967 A1 | 8/2024 | Wells et al. | |
| 2024/0286280 A1 | 8/2024 | Karimi Eskandary et al. | |
| 2024/0294219 A1 | 9/2024 | Gildert et al. | |
| 2024/0294220 A1 | 9/2024 | Gildert et al. | |
| 2024/0300115 A1 | 9/2024 | Rose et al. | |
| 2024/0316759 A1 | 9/2024 | Maleki et al. | |
| 2024/0316761 A1 | 9/2024 | Rose et al. | |
| 2024/0316795 A1 | 9/2024 | Hill et al. | |
| 2024/0316796 A1 | 9/2024 | Maleki et al. | |
| 2024/0351211 A1 | 10/2024 | Shannon et al. | |
| 2024/0351212 A1 | 10/2024 | Shannon et al. | |

(56) References Cited

U.S. PATENT DOCUMENTS

| | | |
|---|---|---|
| 2024/0359319 A1 | 10/2024 | Rose et al. |
| 2024/0359331 A1 | 10/2024 | Gildert |
| 2024/0367316 A1 | 11/2024 | Gildert et al. |
| 2024/0367317 A1 | 11/2024 | Gildert et al. |
| 2024/0375299 A1 | 11/2024 | Shannon et al. |
| 2024/0393190 A1 | 11/2024 | Fishel et al. |
| 2025/0001611 A1 | 1/2025 | Gildert |
| 2025/0001612 A1 | 1/2025 | Gildert |
| 2025/0001613 A1 | 1/2025 | Gildert |
| 2025/0050495 A1 | 2/2025 | Gildert et al. |
| 2025/0050496 A1 | 2/2025 | Gildert et al. |
| 2025/0050497 A1 | 2/2025 | Gildert et al. |

FOREIGN PATENT DOCUMENTS

| | | |
|---|---|---|
| WO | WO 2022217346 A1 | 10/2022 |
| WO | WO 2022232934 A1 | 11/2022 |
| WO | WO 2022241570 A1 | 11/2022 |
| WO | WO 2023015383 A1 | 2/2023 |
| WO | WO 2023082013 A1 | 5/2023 |
| WO | WO 2023122834 A1 | 7/2023 |
| WO | WO 2023164781 A1 | 9/2023 |
| WO | WO 2023235977 A1 | 12/2023 |
| WO | WO 2024065045 A1 | 4/2024 |
| WO | WO 2024113059 A1 | 6/2024 |
| WO | WO 2024119268 A1 | 6/2024 |
| WO | WO 2024130449 A1 | 6/2024 |
| WO | WO 2024159308 A1 | 8/2024 |
| WO | WO 2024159310 A1 | 8/2024 |
| WO | WO 2024159311 A1 | 8/2024 |
| WO | WO 2024159312 A1 | 8/2024 |
| WO | WO 2024168420 A3 | 8/2024 |
| WO | WO 2024182899 A1 | 9/2024 |
| WO | WO 2024239110 A1 | 11/2024 |

\* cited by examiner

LINEAR ACTUATOR

CROSS-REFERENCE TO RELATED APPLICATIONS

This application is a U.S. National Phase application under 35 U.S.C. § 371 of International Patent Application No. PCT/US2024/019194, filed on Mar. 8, 2024, which claims priority under 35 U.S.C. § 119(e) to U.S. Provisional Patent Application Ser. No. 63/489,610, filed on Mar. 10, 2023, the entire contents of which are hereby incorporated by reference.

STATEMENT REGARDING FEDERALLY SPONSORED RESEARCH OR DEVELOPMENT

This invention was made with government support under Contract Number 80NSSC22CA190 awarded by The National Aeronautics and Space Administration (NASA). The government has certain rights in the invention.

TECHNICAL FIELD

The present disclosure describes example implementations of a linear actuator and, more particularly, a linear ball screw actuator used in a humanoid robot.

BACKGROUND

Linear actuators are used in many different technologies in order to move a load or object bi-directionally in a linear fashion. Many linear actuators have a relatively large weight to performance ratio, i.e., they are heavy given their output linear force. Further, many linear actuators use a leadscrew as a drivetrain, which often results in high friction. For these reasons and others, conventional linear actuators are often unsuitable for mobile robots, such as quadruped robots and humanoid robots.

SUMMARY

In an example implementation, a linear actuator includes a housing; a motor module that includes a motor; and a drivetrain module coupled to the motor module. The drivetrain module includes a ball screw coupled to the motor, a ball nut coupled to and configured to linearly ride on the ball screw during rotation of the ball screw, a rod coupled to the ball nut and configured to extend or retract from the housing based on the ball nut linearly riding on the ball screw during rotation of the ball screw, and an anti-rotation bushing coupled to the rod and including at least one slot configured to engage with and linearly ride on a key coupled to an inner surface of the housing based on the ball nut linearly riding on the ball screw during rotation of the ball screw. The anti-rotation bushing is further configured to restrain the rod against rotation during extension and retraction.

In an aspect combinable with the example implementation, the motor includes a direct current (DC) motor.

In another aspect combinable with the any of the previous aspects, the motor includes a direct current (DC) brushless and frameless motor.

In another aspect combinable with the any of the previous aspects, the anti-rotation bushing includes a bore configured to receive the rod.

In another aspect combinable with the any of the previous aspects, the anti-rotation bushing includes at least one groove formed on an inner radial surface of the anti-rotation bushing and configured to engage the rod.

Another aspect combinable with the any of the previous aspects further includes a sealed angular contact bearing positioned in the housing between the motor module and the drivetrain module.

Another aspect combinable with the any of the previous aspects further includes a first bumper positioned in the housing between the motor module and the drivetrain module.

Another aspect combinable with the any of the previous aspects further includes a second bumper positioned in the housing at an end of the drivetrain module opposite the motor module.

In another aspect combinable with the any of the previous aspects, each of the first and second bumpers include urethane bumpers.

In another aspect combinable with the any of the previous aspects, the first bumper includes a first stop that defines a retracted position of the rod when the ball nut is adjacent or abutting the first bumper.

In another aspect combinable with the any of the previous aspects, the second bumper includes a second stop that defines an extended position of the rod when the ball nut is adjacent or abutting the second bumper.

In another aspect combinable with the any of the previous aspects, the anti-rotation bushing includes a rigid, non-metallic material.

In another aspect combinable with the any of the previous aspects, the rigid, non-metallic material includes a plastic material.

Another aspect combinable with the any of the previous aspects further includes an encoder configured to determine a number of rotations of the motor.

In another aspect combinable with the any of the previous aspects, a gear ratio is between 40:1 and 50:1.

In another aspect combinable with the any of the previous aspects, a gear ratio is no more than 100:1.

In another example implementation, a humanoid robot includes at least one body assembly that includes at least one body joint assembly; and at least one pair of linear actuators that form the at least one body joint, the at least one pair of linear actuators configured to operate in combination to adjust the at least one body joint assembly in two degrees of freedom through differential linear actuation. Each of the linear actuators includes a motor module that includes a motor; and a drivetrain module coupled to the motor module. The drivetrain module includes a ball screw coupled to the motor, a ball nut coupled to and configured to linearly ride on the ball screw during rotation of the ball screw, a rod coupled to the ball nut and configured to extend or retract from the housing based on the ball nut linearly riding on the ball screw during rotation of the ball screw, and an anti-rotation bushing coupled to the rod and including at least one slot configured to engage with and linearly ride on a key coupled to an inner surface of the housing based on the ball nut linearly riding on the ball screw during rotation of the ball screw. The anti-rotation bushing is further configured to restrain the rod against rotation during extension and retraction.

In an aspect combinable with the example implementation, the at least one body assembly is an upper body assembly, and the at least one body joint assembly includes at least one of a shoulder assembly, an upper arm assembly, or a lower arm assembly.

In another aspect combinable with the any of the previous aspects, the at least one body assembly is a lower body assembly, and the at least one body joint assembly includes at least one of a hip assembly, an upper leg assembly, or a lower leg assembly.

In another aspect combinable with the any of the previous aspects, the body joint assembly includes the upper leg assembly, and the at least one pair of joint linear actuators includes a first linear actuator of a first size; a second linear actuator of the first size; and a third linear actuator of a second size larger than the first size.

In another aspect combinable with the any of the previous aspects, the motor includes a direct current (DC) motor.

In another aspect combinable with the any of the previous aspects, the motor includes a direct current (DC) brushless and frameless motor.

In another aspect combinable with the any of the previous aspects, the anti-rotation bushing includes a bore configured to receive the rod.

In another aspect combinable with the any of the previous aspects, the anti-rotation bushing includes at least one groove formed on an inner radial surface of the anti-rotation bushing and configured to engage the rod.

In another aspect combinable with the any of the previous aspects, each of the linear actuators further includes a sealed angular contact bearing positioned in the housing between the motor module and the drivetrain module.

In another aspect combinable with the any of the previous aspects, each of the linear actuators further includes a first bumper positioned in the housing between the motor module and the drivetrain module.

In another aspect combinable with the any of the previous aspects, each of the linear actuators further includes a second bumper positioned in the housing at an end of the drivetrain module opposite the motor module.

In another aspect combinable with the any of the previous aspects, each of the first and second bumpers include urethane bumpers.

In another aspect combinable with the any of the previous aspects, the first bumper includes a first stop that defines a retracted position of the rod when the ball nut is adjacent or abutting the first bumper.

In another aspect combinable with the any of the previous aspects, the second bumper includes a second stop that defines an extended position of the rod when the ball nut is adjacent or abutting the second bumper.

In another aspect combinable with the any of the previous aspects, the anti-rotation bushing includes a rigid, non-metallic material.

In another aspect combinable with the any of the previous aspects, the rigid, non-metallic material includes a plastic material.

In another aspect combinable with the any of the previous aspects, each of the linear actuators further includes an encoder configured to determine a number of rotations of the motor.

In another aspect combinable with the any of the previous aspects, a gear ratio of each of the linear actuators is between 40:1 and 50:1.

In another aspect combinable with the any of the previous aspects, a gear ratio of each of the linear actuators is no more than 100:1.

Implementations of a linear actuator according to the present disclosure can include one, some, or all of the following features. For example, linear actuators according to the present disclosure are optimized for low friction, low backlash, and minimal mass, using aluminum and plastic structures for more efficient use in a mobile robot, such as a humanoid robot. As another example, linear actuators according to the present disclosure operate as "two force members" and are internally restrained from rotation and avoid heavy rotational bearings. As a further example, linear actuators according to the present disclosure are scalable for several sizes, gear ratios, and locations in a humanoid robot.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
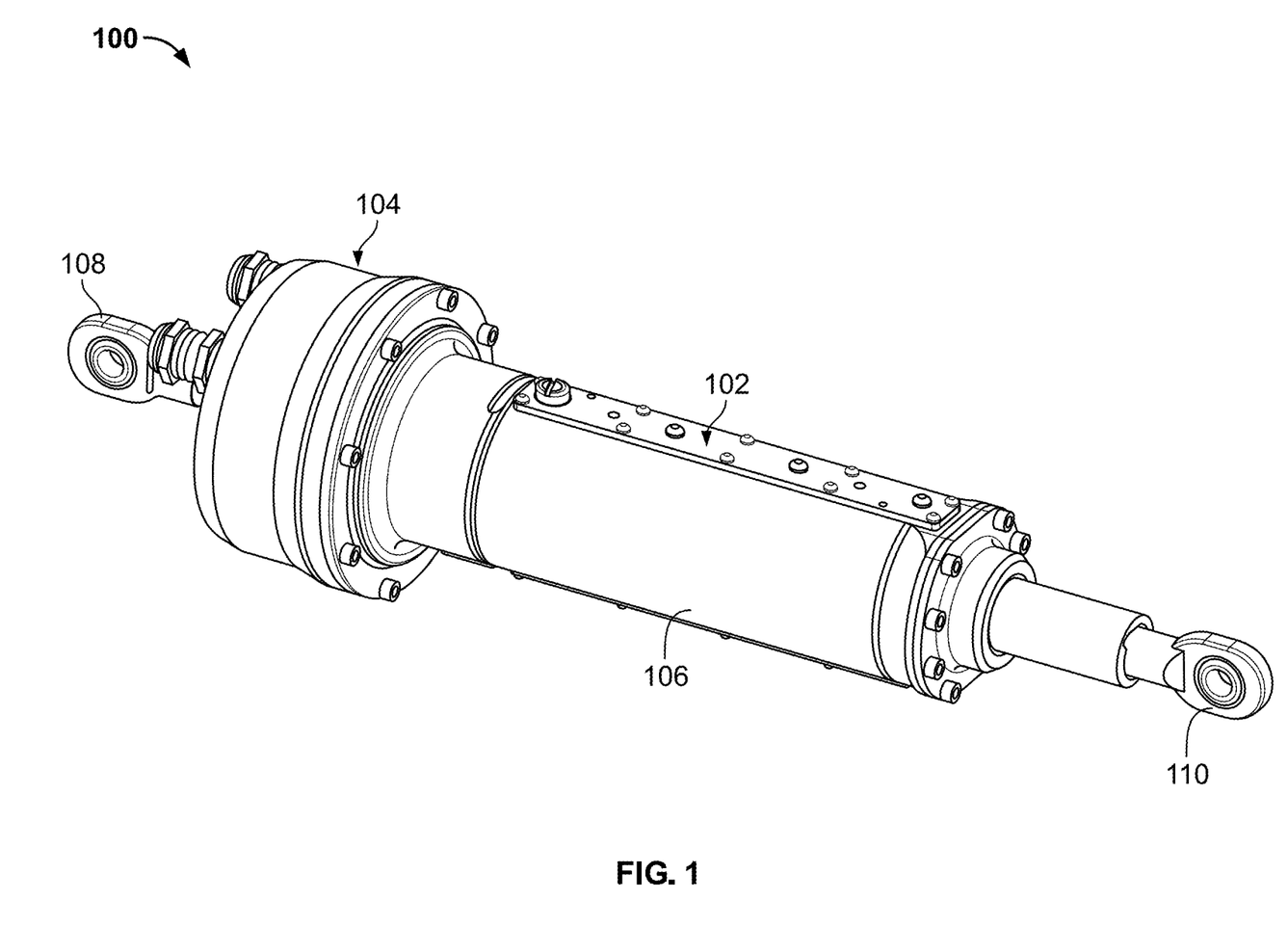
FIG. 1 is an example implementation of a linear ball screw actuator according to the present disclosure.

FIG. 1 is an example implementation of a linear ball screw actuator 100 according to the present disclosure. While the linear ball screw actuator 100 can be used for a variety of mechanical tasks that require linear movement of a load or object that is coupled to the linear ball screw actuator 100, in some aspects, the linear ball screw actuator 100 shown in FIG. 1 can be applied to mobile robots, such as humanoid robots. The application of the linear ball screw actuator 100 shown in FIG. 1 to a humanoid robot, such as use in upper body appendages (e.g., upper arms, forearms) and lower body appendages (e.g., upper legs, lower legs) can provide advantages not found in conventional linear actuators.

For example, greater operational efficiency of humanoid or mobile robot can depend on characteristics such as friction, backlash, reflected inertia, mass, and cost. Conventional linear actuators often are heavy for their performance and therefore not meant for mobile robotics. Further, many conventional linear actuators use a leadscrew as a drivetrain, which results in high friction that can reduce battery life, force transparency, back-driveability/human safety; each of these characteristics can be undesirable for mobile robots. Further, many conventional linear actuators use bulky and heavy roller bearings to prevent off-axis forces from damaging internal components of the actuator. In some cases, conventional linear actuators include a secondary transmission (such as a timing belt/pulley) between a motor and drivetrain, resulting in larger volume, larger mass, and generally higher gear ratios resulting in excess reflected inertia. Finally, conventional linear actuators often do not include anti-rotation features, thereby requiring external anti-rotation features upon integration into a machine such as mobile robot. This exclusion often prevents use in a MIMO (multi in, multi out) joint, where two actuators drive two joints differentially and thus require the use of spherical bearings at their ends, which cannot resist this rotation tendency.

The example implementation of the linear ball screw actuator 100 shown in FIG. 1 includes operational and structural characteristics that overcome the disadvantages of conventional linear actuators for mobile robots, such as humanoid robots. For example, the illustrated architecture of the linear ball screw actuator 100 is optimized for minimal mass, in part by using optimal materials such as aluminum and plastic (or other rigid, non-metallic) structures. The linear ball screw actuator 100 is designed to be a "two force member" by eliminating all or most off-axis loading that would conventionally require heavy linear bearings. Example implementations of the linear ball screw actuator 100 use a ball screw as a drivetrain, which can be low friction, low backlash, and low cost relative to a leadscrew. Further, the linear ball screw actuator 100 can use a brushless, frameless motor that is directly integrated with the ball screw drivetrain to minimize excess parts and secondary transmissions.

The linear ball screw actuator 100 can be integrated into a joint of a humanoid (or other mobile) robot with a lower than conventional gear ratio to minimize reflected inertia while also minimizing actuator mass. In some aspects, for example, lower body assembly joints of a humanoid robot may use the linear ball screw actuator 100 (e.g., in pairs) that have between a 40:1 and 50:1 gear ratio. Upper body assembly joints of a humanoid robot may use the linear ball screw actuator 100 (e.g., in pairs) that have up to a 100:1 gear ratio. In comparison, conventional linear actuators may have gear ratios of up to 200:1. The linear ball screw actuator 100 can be scaled for several sizes, gear ratios, and locations in a humanoid robot as well.

In order to provide more efficient linear movement, implementations of the linear ball screw actuator 100 can use a built-in anti-rotation mechanism by constraining a ball nut with a low-friction bushing that rides on anti-rotation keys of the housing of the linear ball screw actuator 100. The illustrated linear ball screw actuator 100 can also use two separable modules (motor/electronics and drivetrain) to improve production and increase ease of assembly. The linear ball screw actuator 100 can also use angular bearings to seal drivetrain grease from entering the motor/electronics module in this dual module architecture. Further, the linear ball screw actuator 100 can use a piston seal to seal drivetrain grease in the actuator and protect an inner volume of the linear ball screw actuator 100 from ingress.

As shown in FIG. 1, the example implementation of the linear ball screw actuator 100 is comprised of a motor module 104 and drivetrain module 102 coupled together and enclosed in housing 106. A rod end 108 extends from the motor module 104 and can be coupled, e.g., to a first point of a joint of a humanoid robot. A piston end 110 extends from the drivetrain module 102 and can be coupled, e.g., to a second point of a joint of a humanoid robot.

Figure 2A:
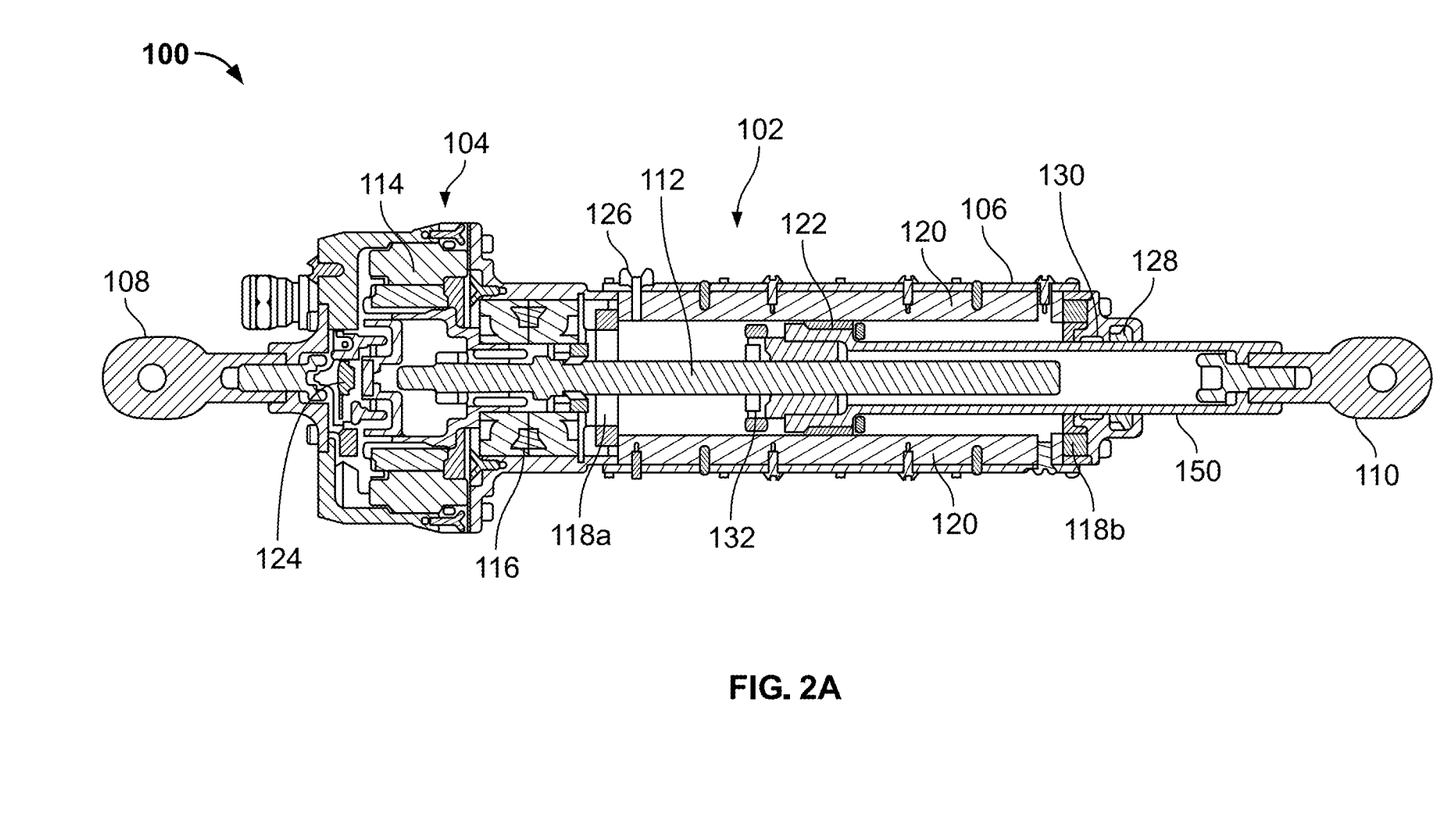
FIG. 2A is an axial cross-section of the linear ball screw actuator of FIG. 1 according to the present disclosure.
Figure 2B:
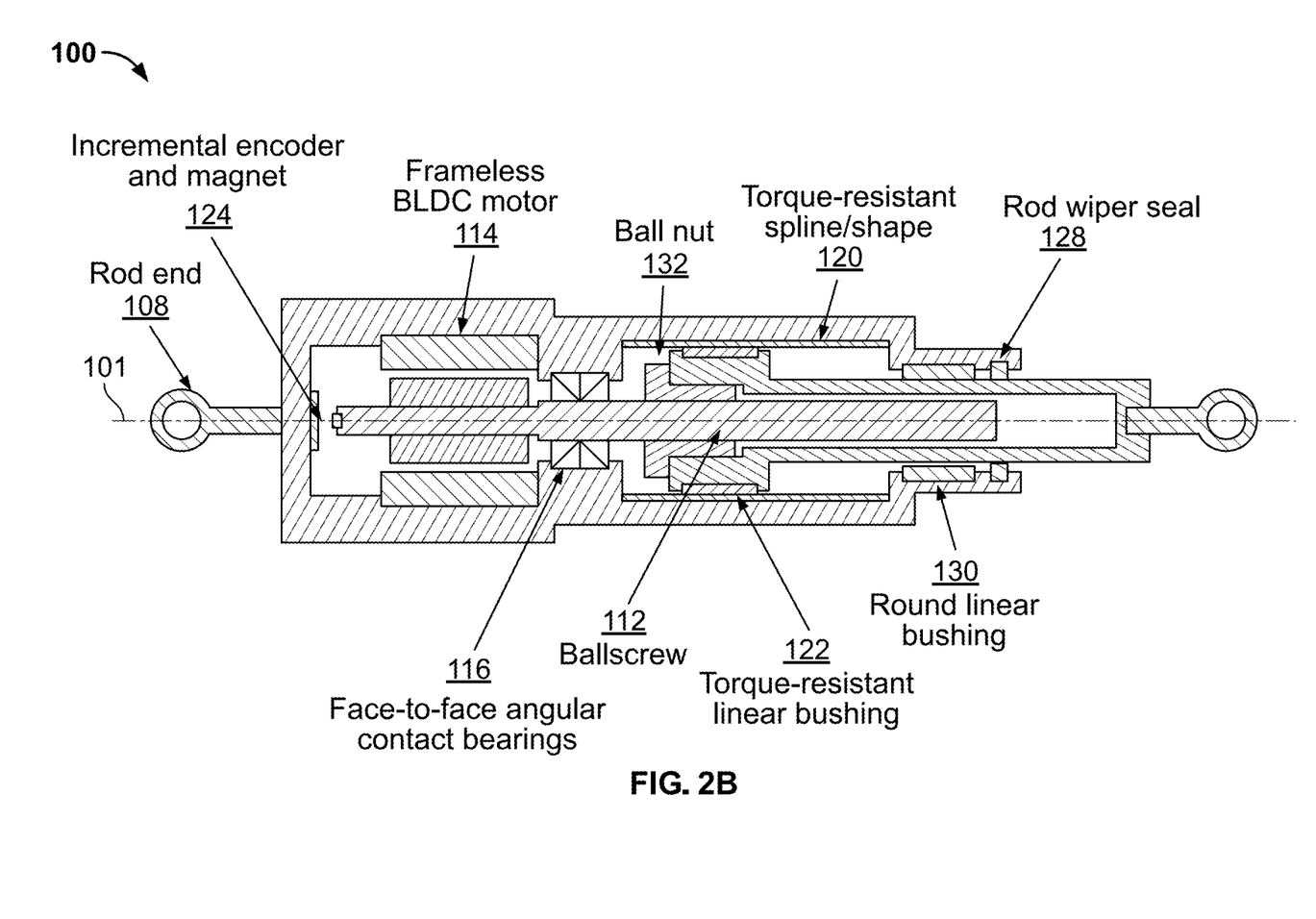
FIG. 2B is a schematic illustration that shows an axial cross-section of the linear ball screw actuator of FIG. 1 according to the present disclosure.

FIG. 2A is an axial cross-section of the linear ball screw actuator 100 of FIG. 1. FIG. 2B is a schematic illustration that shows an axial cross-section of the linear ball screw actuator of FIG. 1. As shown in FIGS. 2A and 2B, the housing 106 encloses the components of the motor module 104 and the drivetrain module 102. Starting with the motor module 104, this portion of the linear ball screw actuator 100 includes a motor 114 and contact bearings 116 to receive a ball screw 112 of the drivetrain module 102. In some aspects, the motor 114 comprises a direct current (DC) motor, such as a brushless and frameless DC motor. The contact bearings 116, in this example, can be face-to-face sealed, angular contact bearings that support the ball screw 112, e.g., as it is forcibly rotated by the motor 114 to actuate the linear ball screw actuator 100.

The motor module 104 further includes, in this example, an encoder 124 coupled to the motor 114. The encoder 124, in some aspects, is an incremental encoder for motor commutation such that a position of the linear ball screw actuator 100 (e.g., a position between fully retracted and fully extended) can be determined by a number of motor rotations of the motor 114. In some further aspects, the encoder 124 can be a multi-turn absolute position encoder, in which the position of the linear ball screw actuator 100 can be absolutely determined based on motor operation.

As shown in FIGS. 2A and 2B, the drivetrain module 102 is coupled to the motor module 104 between the contact bearings 116 and a bumper 118a, through each of which the ball screw 112 of the drivetrain module 102 extends. In some aspects, the bumper 118a is a urethane bumper that minimizes vibration and impact within the linear ball screw actuator 100 during operation. A corresponding bumper 118b (e.g., urethane bumper) is also positioned at an opposite end of the housing 106 in the drivetrain module 102 to further minimize vibration and impact during operation of the linear ball screw actuator 100.

As shown in this example, the drivetrain module 102 (i.e., the drivetrain of the linear ball screw actuator 100) includes the ball screw 112 and a ball nut 132 threaded onto the ball screw 112 and drivable by the ball screw 112 (e.g., by rotation thereof) to operate the linear ball screw actuator 100 between the retracted position (in which a distance between the rod end 108 and the piston end 110 is minimized) and an extended position (in which a distance between the rod end 108 and the piston end 110 is maximized). The ball nut 132, threaded onto the ball screw 112, is also coupled to rod 150, which retracts and extends during actuation of the linear ball screw actuator 100 by the translation of rotational motion of the ball screw 112 to linear motion of the ball nut 132.

The drivetrain module 102 further includes an anti-rotation bushing 122 that is coupled to the rod 150 (e.g., the rod 150 extends through the anti-rotation bushing 122) and rides on one or more splines (or keys) 120 as the ball nut 132 moves linearly on the ball screw 112. In some aspects, the anti-rotation bushing 122 provides a connection between the rod 150 and the housing 106 (on which the key(s) 120 are formed on or coupled to an interior surface), thereby preventing the rod 150 from rotating about a linear axis 101 of the linear ball screw actuator 100 (shown in FIG. 2B) during linear motion of the rod 150 along the axis 101. In some aspects, the anti-rotation bushing 122 can be made of a reduced friction material, such as plastic or other rigid, non-metal material in order to reduce friction during actuation of the linear ball screw actuator 100 and eliminate heavier roller bearings (thereby allowing use of the linear ball screw actuator 100 in a MIMO joint).

Figure 3:
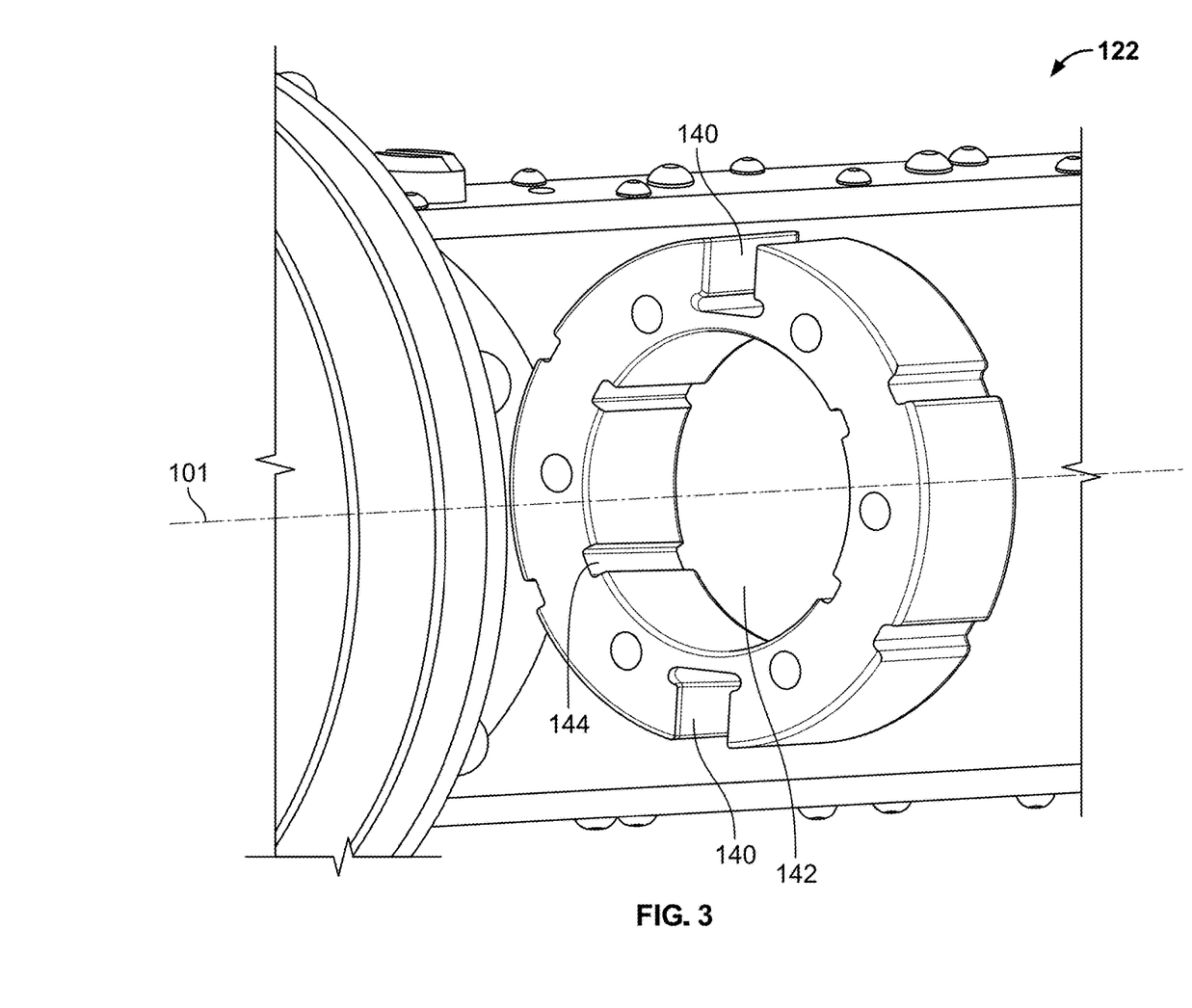
FIG. 3 is an isometric view of a portion of the linear ball screw actuator of FIG. 1 according to the present disclosure.

Turning briefly to FIG. 3, this figure shows an isometric view of a portion of the linear ball screw actuator 100 of FIGS. 1, 2A, and 2B that includes the anti-rotation bushing 122. As shown in FIG. 3, the anti-rotation bushing 122 is generally ring-shaped and includes one or more slots 140 formed on an outer radial surface to receive (and ride on during linear movement) the keys 120 A bore 142 is formed in the anti-rotation bushing 122 to receive the rod 150 there through. In some aspects, as shown, one or more grooves 144 can be formed on an inner radial surface to engage keyed portions of the rod 150 (not shown). Thus, the anti-rotation bushing 122 can coupled the rod 150 to the housing 106 (through the slots 140 engaging with the keys 120) so prevent rotation of the rod 150 about the axis 101 during linear motion.

Turning back to FIGS. 2A and 2B, a support bushing 130 and rod seal 128 are positioned about the rod 150 toward the piston end 110 of the linear ball screw actuator 100. The support bushing 130 provides further support to the rod 150 as it moves linear during actuation of the linear ball screw actuator 100. The piston seal 128 can seal an interior volume of the housing 106 against lubricant leakage into am ambient environment and also seal against debris or moisture entering the housing 106 from the ambient environment. During operation of the linear ball screw actuator 100, air or other fluid can escape the housing 106 through one or more vents 126 that open (e.g., due to an excess pressure in the housing 106) to allow such release of fluid.

In an example operation of the linear ball screw actuator 100, the motor 114 is activated, e.g., based on a command from a controller or sensor that reaches a threshold value. For example, when installed in a humanoid robot, a controller of the robot can signal the motor 114 to activate in order to achieve a specified movement of the robot (e.g., walking, reaching, pivoting, squatting, etc.). In some aspects, the signal can indicate a particular rotation of the motor 114 in order to either shorten (retract) or lengthen (extend) the linear ball screw actuator 100. As the motor 114 is activated and begins to turn, it drives rotation of the ball screw 112. The rotation of the ball screw 112 drives the ball nut 132 to rotate as well and linearly move along the ball screw 112. The ball nut 132, which is coupled to the rod 150, drives the rod 150 in a linear fashion to extend from or retract into the housing 106 (depending on motor rotation direction).

In some aspects, bumper 118a provides a "soft stop" to the ball nut 132 when moving in a "retracting" motion (i.e., toward the motor 114), while bumper 118b provides a "soft stop" to the ball nut 132 when moving in an "extending" motion (i.e., away the motor 114). When the ball nut 132 is adjacent or abuts the bumper 118a, the linear ball screw actuator 100 can be in a fully retracted position. When the ball nut 132 is adjacent or abuts the bumper 118b, the linear ball screw actuator 100 can be in a fully extended position.

During linear motion of the rod 150 (and ball nut 132) between the fully retracted position and fully extended position, little or no rotation of the rod 150 about axis 101 occurs. For example, the rod 150 is coupled to the housing 106 through engagement with the anti-rotation bushing 122 that is engaged with and rides on the keys 120, which prevents rotation of the rod 150. This MIMO linear movement of the linear ball screw actuator 100 without rotation can provide for advantages when used in a joint of a humanoid robot and, more particularly, when a pair (or triad) of linear ball screw actuators 100 are used to provide joint movement in a humanoid robot.

Figure 4:
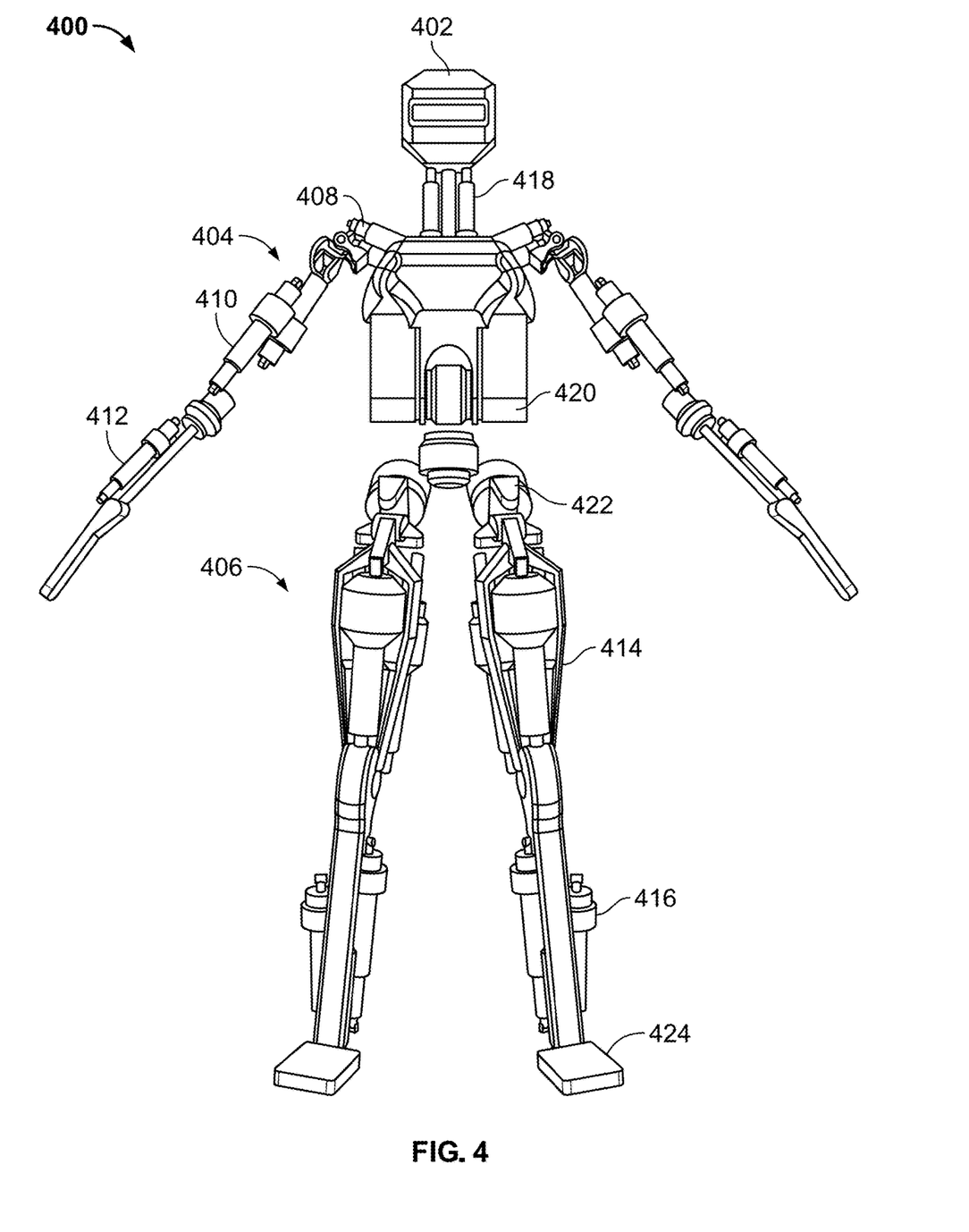
FIG. 4 is an example implementation of a humanoid robot that uses an example implementation of a linear ball screw actuator according to the present disclosure.

FIG. 4 is an example implementation of a humanoid robot 400 that uses an example implementation of a linear ball screw actuator according to the present disclosure. Humanoid robot 400 includes a head 402, an upper body assembly 404, and a lower body assembly 406 according to the present disclosure. Generally, humanoid robot 400 comprises a general purpose robot product that performs useful work in the real world (without the use of emotions) such as tasks that involve dangerous, hazardous, or even normal day-to-day tasks incapable (or capable) of being performed by a human being. Example tasks can include handling dangerous or hazardous materials (e.g., munitions, radioactive material, chemical material), loading and unloading (e.g., items or objects that are immovable or otherwise by a single or multiple human beings), or tasks performed in hazardous or dangerous environments.

In the present disclosure, the term "humanoid robot" can refer to a robot that is generally human in shape, e.g., with a torso, a trunk, two torso appendages (i.e., arms/hands), two trunk appendages (i.e., legs/feet), and a head or skull appendage. However, the term "humanoid robot" can also refer to a robot that resembles just a portion of a human, such as only a torso with torso appendages, or only a trunk with trunk appendages. In addition, the present disclosure describes aspects of a humanoid robot (such as, for example, pairs of linear actuators that form a joint assembly or part of an appendage and operate in combination to adjust the joint assembly or appendage in two degrees of freedom through differential linear actuation) that can be applied in non-humanoid robots, such as quadruped robots or otherwise.

Humanoid robot 400 can be autonomously controlled (untethered to any external control system) or human-controlled (e.g., tethered or wirelessly) to perform tasks. For example, humanoid robot 400 can perform useful work with mobility and kinematic movement that at least partially mimics that of a human being, and in spaces occupied by humans or not. The humanoid robot 400, in some aspects, is designed for practical portability and movement and for mass production.

The humanoid robot 400 can perform at various levels of autonomy. For example, example implementations of the humanoid robot 400 can be enabled for untethered locomotion testing, with some limited manipulation capabilities. In some aspects, example implementations of the humanoid robot 400 can be configured for full manipulation and locomotion.

The upper body assembly 404 includes, for example, a torso assembly 420, shoulder assemblies 408, upper arm assemblies 410, lower arm assemblies 412, and a neck assembly 418. Generally, one, some, or all of the illustrated assemblies comprise pairs of linear ball screw actuators 100 that work by differential linear actuation to adjust or move the assembly in at least two degrees of freedom (as explained in more detail herein).

The lower body assembly 406 includes a hip assembly 422 (that couples to the torso assembly 420), upper leg assemblies 414, lower leg assemblies 416, and foot assemblies 424 (that in some aspects are part of the lower leg assemblies 416). Generally, one, some, or all of the illustrated assemblies comprise pairs (or triads) of linear ball screw actuators 100 that work by differential linear actuation to adjust or move the assembly in at least two degrees of freedom (as explained in more detail herein). In some aspects, each upper leg assembly 414 includes a pair of linear ball screw actuators 100 of one size in combination with a third linear ball screw actuator 100 of another size (as described more fully herein).

The pairs (or triads) of linear ball screw actuators 100 described herein can be actuated to control movement through differential linear actuation in at least two degrees of freedom. For example, the shoulder assemblies 408 can provide for flexion and extension of the arms of the humanoid robot 400 (e.g., lifting the arm to the front and rear). The shoulder assemblies 408 can provide for abduction and adduction (AA) of the arms of the humanoid robot 400. The upper arm assemblies 410 can provide for internal/external (IE) rotation of the arms of the humanoid robot 400. The combination of the upper and lower arm assemblies 410 and 412 (e.g., in combination with a radial actuator in some aspects) can provide for flexion-extension (FE) of the lower arms of the humanoid robot 400.

In example aspects of the humanoid robot 400, the use (e.g., predominant use) of linear ball screw actuators 100 (which have desirable performance per cost and manufacturability compared to other forms of actuators) can provide for lower gear ratios (as compared to traditionally used actuators in GPRs), which enable more dynamic behaviors and increases system robustness to environmental collisions/interactions. The kinematic use of linear ball screw actuators 100 as shown can provide for ordering and mechanisms that enable the humanoid robot 400 to move in a fashion that achieves desired functional attributes such as payloads/torques, speeds, efficiency, human-like form factor, and also sufficient range of motion. The illustrated pairs of linear ball screw actuators 100 also possess variable moment for appendages (e.g., legs and/or arms) that mimic the way human muscles work in nature.

In some aspects, each of the illustrated linear ball screw actuators 100 can be sized for expected or desired movement and/or force output (e.g., for lifting or otherwise asserting a force to provide for movement of the humanoid robot 400, itself, or of another object). In some aspects, use each of the illustrated linear ball screw actuators 100 can use a motor paired with a ball screw (as previously described) for primary (and efficient) speed reduction with a low (e.g., between 10:1 and 50:1) gear ratio. In some aspects each of the illustrated linear ball screw actuators 100 can be a quasi-direct drive (QDD) actuator. As described, each pair of the illustrated linear ball screw actuators 100 can operate through differential linear actuation, such that one linear ball screw actuator 100 of the pair can be controlled (e.g., elongated or shortened) independently of the other linear ball screw actuator 100 of the pair.

As described, each of the illustrated pairs of linear ball screw actuators 100 can provide (through differential linear actuation) of at least two degrees of freedom of movement of a particular portion of the humanoid robot 400. For example, two degrees of shoulder freedom of roll and yaw can be provided through differential linear actuation of the pair of linear ball screw actuators 100 of shoulder assemblies 408. Two degrees of torso freedom of roll and pitch can be provided through differential linear actuation of a pair of linear ball screw actuators 100 of torso assembly 420. Two degrees of ankle freedom of roll and pitch can be provided through differential linear actuation of the pair of linear ball screw actuators 100 of lower leg assemblies 416. Two degrees of hip freedom of roll and pitch can be provided through differential linear actuation of the pair of (smaller) linear ball screw actuators 100 and a (larger) thigh linear ball screw actuator 100 of upper leg assemblies 414.

The two degrees of freedom of particular assemblies of the humanoid robot 400 can have particular ranges of motions. For example, Table 1 shows example ranges of motions (ROM) for particular degrees of freedom (the values of which are for examples only):

TABLE 1

| Deg. of Freedom | Absolute ROM (+) | Absolute ROM (−) | Working ROM (+) | Working ROM (−) |
|---|---|---|---|---|
| Torso pitch | 20 | −80 | 15 | −75 |
| Torso roll | 15 | −15 | 10 | −10 |
| Torso yaw | 50 | −60 | 45 | −45 |
| Shoulder AA | 10 | −95 | 5 | −90 |
| Shoulder IE | 30 | −30 | 25 | −25 |
| Shoulder FE | 35 | −125 | 30 | −120 |

TABLE 1-continued

| Deg. of Freedom | Absolute ROM (+) | Absolute ROM (−) | Working ROM (+) | Working ROM (−) |
|---|---|---|---|---|
| Elbow FE | 10 | −150 | 5 | −145 |
| Hip IE | 35 | −65 | 30 | −60 |
| Hip AA | −45 | −20 | 40 | −15 |
| Hip FE | 35 | −110 | 30 | −105 |
| Knee FE | 150 | 0 | 145 | 5 |
| Ankle FE | 45 | −90 | 42.5 | −87.5 |
| Ankle IE | 20 | −45 | 15 | −40 |

Each of the particular degrees of freedom shown in Table 1 can have a maximum continuous torque in a range of between about 20 to about 150 Nm. Each of the particular degrees of freedom shown in Table 1 can have a maximum peak torque in a range of between about 75 to about 500 Nm. Each of the particular degrees of freedom shown in Table 1 can have a minimum no-load speed in a range of between about 3 to about 12 radians/sec. Each of the particular degrees of freedom shown in Table 1 can have a maximum gear ratio in a range of between about 20 to about 170. The linear ball screw actuators 100 that provide for particular upper body degrees of freedom shown in Table 1 can have a maximum actuator reflected inertia in a range of between about 0.05 to about 2 kg*$m^2$. The linear ball screw actuators 100 that provide for particular upper body degrees of freedom shown in Table 1 can have a minimum actuator reflected inertia in a range of between about 0.02 to about 1.5 kg*$m^2$.

Another not shown in FIG. 4, certain components, such as motor controllers for linear and radial actuators and other control components include and/or are connected by wiring or cabling. One issue that makes some robots appear less human and not conform to a human envelope is excessive cabling that is visible outside of a robot's outer shell. This excessive wiring may also present a snag hazard. Example implementations of the humanoid robot 400 minimize external cabling by maintaining cabling internally or minimizing external cabling. Example implementations of the humanoid robot 400 also help maintain cabling within the human envelope without putting undue stress on the cabling. More particularly, example implementations of the humanoid robot 400 can define wire paths across joints to minimize stress on both sides of the joint, which allows for no or minimum strain on the board connectors to which cabling connects.

Cabling and board joints may experience undue stress when the ratio of cable path length change to total cable length is too high. Minimizing the cable path length change through the range of motion of a joint to total cable length can ensure that cable does not stretch and put unnecessary stress on the cable, connectors, or boards. Furthermore, bending cables with too sharp a radius can induce local stresses in the cable, which can propagate to apply stresses on the connectors or boards. Example implementations of the humanoid robot 400 can implement features to minimize cable path length change and maximize bend radius.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A linear actuator, comprising:
    a housing;
    a motor module that comprises a motor; and
    a drivetrain module coupled to the motor module and comprising:
        a ball screw coupled to the motor,
        a ball nut coupled to and configured to linearly ride on the ball screw during rotation of the ball screw,
        a rod coupled to the ball nut and configured to extend or retract from the housing based on the ball nut linearly riding on the ball screw during rotation of the ball screw, and
        an anti-rotation bushing coupled to the rod and comprising at least one slot configured to engage with and linearly ride on a key coupled to an inner surface of the housing based on the ball nut linearly riding on the ball screw during rotation of the ball screw, the anti-rotation bushing further configured to restrain the rod against rotation during extension and retraction, the anti-rotation bushing comprising a bore configured to receive the rod.

2. The linear actuator of claim 1, wherein the motor comprises a direct current (DC) motor.

3. The linear actuator of claim 1, wherein the motor comprises a direct current (DC) brushless and frameless motor.

4. The linear actuator of claim 1, wherein the anti-rotation bushing comprises at least one groove formed on an inner radial surface of the anti-rotation bushing and configured to engage the rod.

5. The linear actuator of claim 1, further comprising a sealed angular contact bearing positioned in the housing between the motor module and the drivetrain module.

6. The linear actuator of claim 1, further comprising a first bumper positioned at a first end of the housing adjacent the motor module.

7. The linear actuator of claim 6, further comprising a second bumper positioned at a second end of the housing at an end of the drivetrain module opposite the first end.

8. The linear actuator of claim 7, wherein each of the first and second bumpers comprise urethane bumpers.

9. The linear actuator of claim 7, wherein the first bumper comprises a first stop that defines a retracted position of the rod when the ball nut is adjacent or abutting the first bumper.

10. The linear actuator of claim 7, wherein the second bumper comprises a second stop that defines an extended position of the rod when the ball nut is adjacent or abutting the second bumper.

11. The linear actuator of claim 1, wherein the anti-rotation bushing comprises a rigid, non-metallic material.

12. The linear actuator of claim 11, wherein the rigid, non-metallic material comprises a plastic material.

13. The linear actuator of claim 1, further comprising an encoder configured to determine a number of rotations of the motor.

14. The linear actuator of claim 1, wherein a gear ratio is between 40:1 and 50:1.

15. The linear actuator of claim 1, wherein a gear ratio is no more than 100:1.

16. A humanoid robot, comprising:
    at least one body assembly that comprises at least one body joint assembly; and
    at least one pair of linear actuators that form the at least one body joint, the at least one pair of linear actuators configured to operate in combination to adjust the at least one body joint assembly in two degrees of freedom through differential linear actuation, each of the linear actuators comprising:
        a motor module that comprises a motor; and
        a drivetrain module coupled to the motor module and comprising:
            a ball screw coupled to the motor,
            a ball nut coupled to and configured to linearly ride on the ball screw during rotation of the ball screw,
            a rod coupled to the ball nut and configured to extend or retract from the housing based on the ball nut linearly riding on the ball screw during rotation of the ball screw, and
            an anti-rotation bushing coupled to the rod and comprising at least one slot configured to engage with and linearly ride on a key coupled to an inner surface of the housing based on the ball nut linearly riding on the ball screw during rotation of the ball screw, the anti-rotation bushing further configured to restrain the rod against rotation during extension and retraction.

17. The humanoid robot of claim 16, wherein the at least one body assembly is an upper body assembly, and the at least one body joint assembly comprises at least one of a shoulder assembly, an upper arm assembly, or a lower arm assembly.

18. The humanoid robot of claim 16, wherein the at least one body assembly is a lower body assembly, and the at least one body joint assembly comprises at least one of a hip assembly, an upper leg assembly, or a lower leg assembly.

19. The humanoid robot of claim 18, wherein the body joint assembly comprises the upper leg assembly, and the at least one pair of joint linear actuators comprises:
    a first linear actuator of a first size;
    a second linear actuator of the first size; and a third linear actuator of a second size larger than the first size.

20. The humanoid robot of claim 16, wherein the motor comprises a direct current (DC) motor.

21. The humanoid robot of claim 16, wherein the motor comprises a direct current (DC) brushless and frameless motor.

22. The humanoid robot of claim 16, wherein the anti-rotation bushing comprises a bore configured to receive the rod.

23. The humanoid robot of claim 22, wherein the anti-rotation bushing comprises at least one groove formed on an inner radial surface of the anti-rotation bushing and configured to engage the rod.

24. The humanoid robot of claim 16, wherein each of the linear actuators further comprises a sealed angular contact bearing positioned in the housing between the motor module and the drivetrain module.

25. The humanoid robot of claim 16, wherein each of the linear actuators further comprises a first bumper positioned at a first end of the housing adjacent the motor module.

26. The humanoid robot of claim 25, wherein each of the linear actuators further comprises a second bumper positioned at a second end of the housing at an end of the drivetrain module opposite the first end.

27. The humanoid robot of claim 26, wherein each of the first and second bumpers comprise urethane bumpers.

28. The humanoid robot of claim 26, wherein the first bumper comprises a first stop that defines a retracted position of the rod when the ball nut is adjacent or abutting the first bumper.

29. The humanoid robot of claim 26, wherein the second bumper comprises a second stop that defines an extended position of the rod when the ball nut is adjacent or abutting the second bumper.

30. The humanoid robot of claim 16, wherein the anti-rotation bushing comprises a rigid, non-metallic material.

31. The humanoid robot of claim 30, wherein the rigid, non-metallic material comprises a plastic material.

32. The humanoid robot of claim 16, wherein each of the linear actuators further comprises an encoder configured to determine a number of rotations of the motor.

33. The humanoid robot of claim 16, wherein a gear ratio of each of the linear actuators is between 40:1 and 50:1.

34. The humanoid robot of claim 16, wherein a gear ratio of each of the linear actuators is no more than 100:1.

* * * * *